March 12, 1957 — J. W. PULASKI — 2,784,455
VACUUM MOLDING APPARATUS
Filed Nov. 26, 1954 — 2 Sheets-Sheet 2

INVENTOR.
JOHN W. PULASKI
BY Sheridan & Biggs
HIS ATTORNEY

United States Patent Office 2,784,455
Patented Mar. 12, 1957

2,784,455

VACUUM MOLDING APPARATUS

John W. Pulaski, Louisville, Ky., assignor to General Electric Company, a corporation of New York Application November 26, 1954, Serial No. 471,470

3 Claims. (Cl. 18—35)

My invention relates to molded plastic articles and more particularly to apparatus for forming such articles.

It is a primary object of my invention to provide new and improved apparatus for vacuum molding plastic articles.

It is another object of my invention to provide apparatus for vacuum molding plastic articles, which is effective to form sharply defined protuberances or bosses on the articles.

A further object of my invention is to provide vacuum molding apparatus which is effective to form a recessed plastic article including sharply defined protuberances or bosses on the sides of the recess.

Another object of my invention is to provide improved vacuum molding apparatus for forming a plastic refrigerator door with a central recess and integral shelf supports protruding from the sides of the recess.

In carrying out my invention I provide apparatus for vacuum forming a plastic article from a sheet of plastic material. The apparatus includes a mold and means for clamping the sheet of material over the mold. A plurality of passageways extend through the mold to the surface thereof for applying a vacuum in the space between the sheet of material and the mold, and when a vacuum is so applied the sheet is caused to assume the shape of the mold to form the article. By my invention I include in this apparatus means for forming sharply defined protuberances of predetermined shape on the surface of the article. The means includes a plurality of forming elements movably mounted within the walls of the mold, actuating means for moving the elements between a retracted position within the walls and an extended position protruding from the walls, and vacuum means for applying a vacuum around the edges of said elements where they protrude through the mold walls. During the forming of the article the vacuum means draw the sheet tightly around the extended elements and thereby, in accordance with my invention, cause sharply defined protuberances to be formed on the article. The elements are then withdrawn to their retracted position whereby the article may be removed from the mold without hindrance.

The novel features which I believe to be characteristic of my invention are set forth with particularity in the appended claims. My invention, however, both as to its organization and method of operation, may be best understood by reference to the following description taken in conjunction with the accompanying drawings in which:

Figure 1:
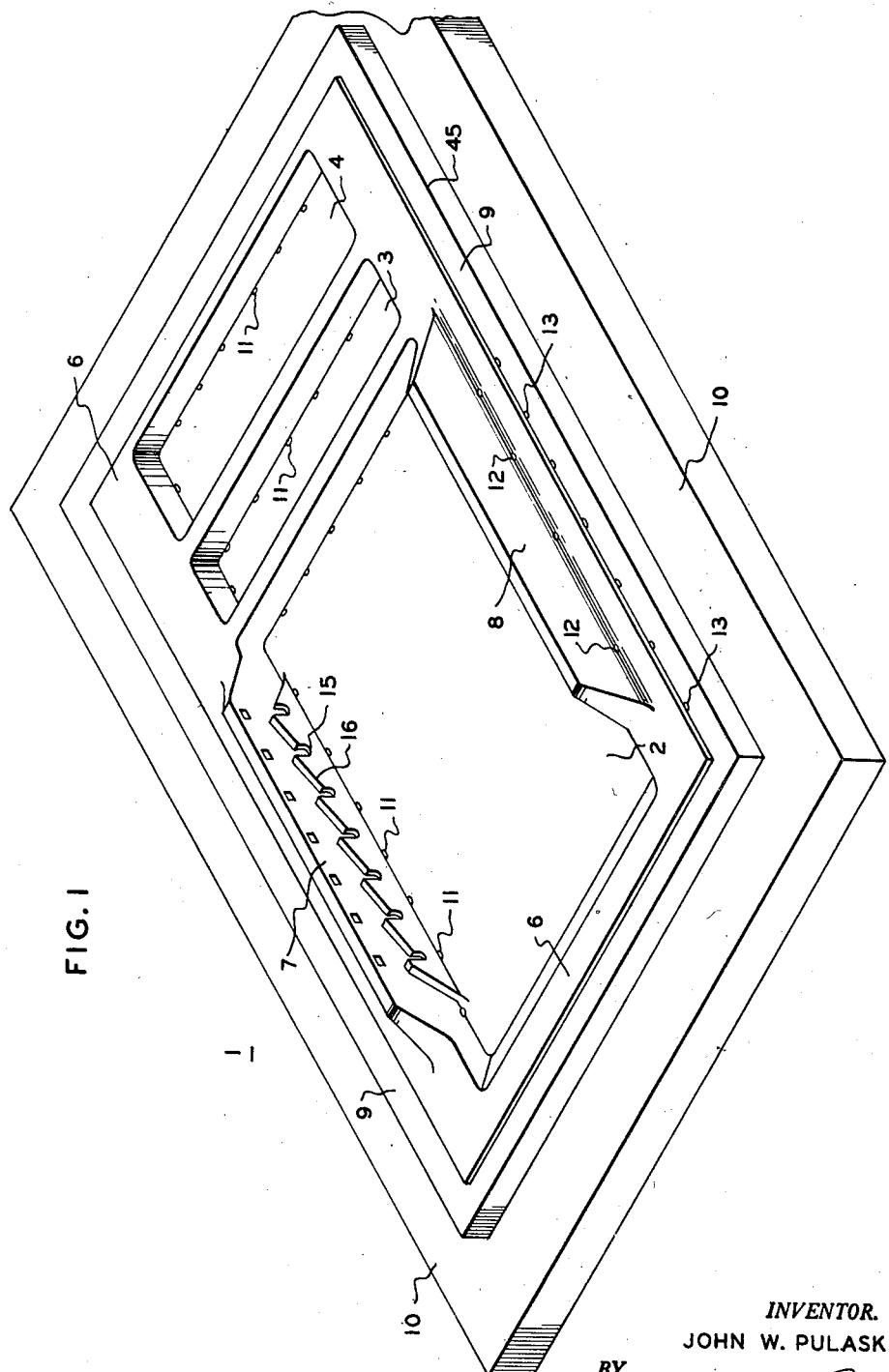
Fig. 1 is a perspective view of a mold adapted for the vacuum forming of plastic refrigerator doors, and including a preferred embodiment of my novel means for forming protuberances on vacuum molded articles.
Figure 2:
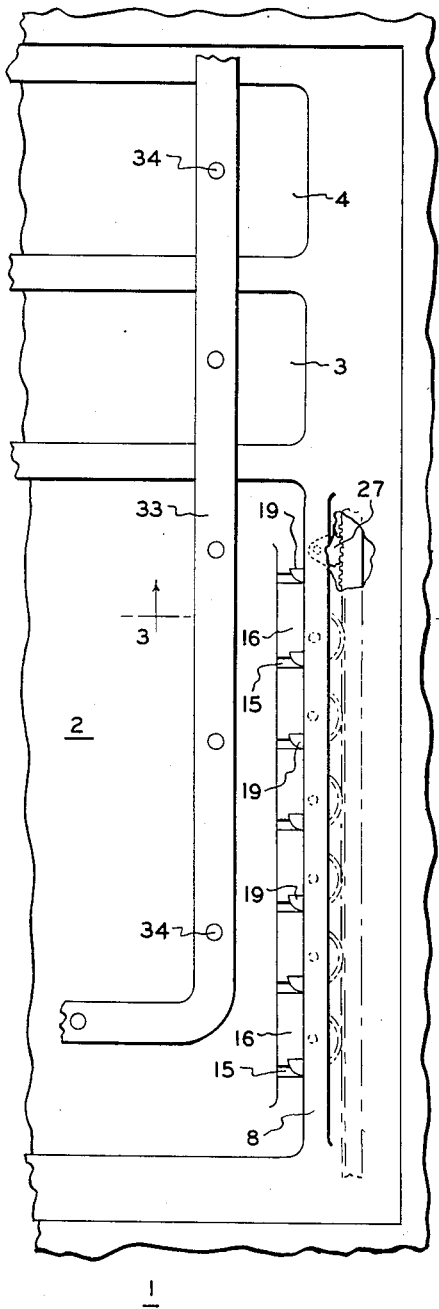
Fig. 2 is a fragmentary plan view of the mold of Fig. 1 showing in addition the heating means used therewith and being partially broken away to show the actuating means for the protuberance forming elements.

Referring now to Fig. 1 I have shown therein a mold 1 particularly adapted for the vacuum forming of plastic refrigerator doors. Specifically the mold is designed to form the inner wall or liner of such doors. The mold 1 includes a large central cavity 2 in its lower portion and two smaller cavities 3 and 4 in its upper portion. The cavities 3 and 4 are of the same depth extending downwardly the same amount from the principal level or surface 6 of the mold surrounding the cavities. The cavity 2 is also of the same basic depth at its top and bottom but it does however have higher side walls than the other two cavities. A pair of upstanding walls 7 and 8 are formed on the surface 6 on the opposite sides of the recess 2 and by jutting upwardly from the surface 6 these walls make the sides of the recess 2 higher than those of the recesses 3 and 4. As will be more fully explained hereinafter these walls 7 and 8 serve to mount my novel means whereby sharply defined protuberances are formed on the sides of the central recess of the door liner produced by the mold.

Figure 3:
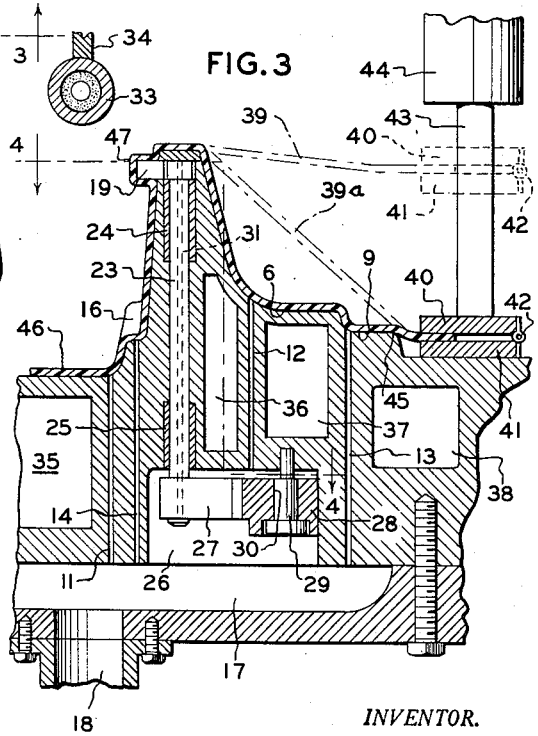
Fig. 3 is a sectional view taken on the line 3—3 of Fig. 2 and further showing the clamping means used to clamp a sheet of plastic material to the mold.

The principal surface 6 of the mold on which the walls 7 and 8 are positioned is itself surrounded by a second surface or level 9. This outer level 9 as may be clearly seen in Figs. 1 and 3 is stepped downwardly somewhat from the level 6. In other words it is slightly lower than the level 6. When a liner is formed on the mold 1, the surface 9 is thus effective to form a peripheral flange on the liner spaced somewhat from the main surface thereof. The mold is completed by another broad flange or level 10 which extends around the surface 9. This outer flange 10 among other uses provides a surface on which the clamping means, to be described hereinafter, may rest when a sheet of material is clamped over the mold.

In order to form a door liner a sheet of thermoplastic material as for example, polystyrene, cellulose acetate, methyl methycrylate, polystyrene-rubber compounds, etc., is placed over the mold, and then the air lying between the sheet of plastic and the mold is exhausted so that atmospheric pressure forces the sheet of plastic down into the mold to assume the contours thereof. This process is commonly called "drawing a vacuum" under the sheet of plastic so that the sheet is "drawn" into the mold. This terminology is, of course, not technically accurate but due to its widespread usage and in order to afford ease of description the process will hereinafter be referred to in such a manner, i. e. it will be referred to as drawing a vacuum or drawing the sheet into the mold.

In order to draw a vacuum beneath the sheet once it is placed over the mold, a plurality of passageways are provided in the mold extending to the surface thereof. Thus passageways 11 lead to the bottom surfaces of the cavities 2, 3, and 4. Similar passageways 12 lead to the principal surface 6 of the mold and other passageways 13 lead to the flange producing surface 9. Additionally a plurality of passageways 14 lead to the bases of a plurality of small recesses 15 which are formed in the side walls 7 and 8 of the cavity 2. More specifically, recesses 15 are formed in sawtooth ledges 16 jutting outwardly from the side walls 7 and 8 and the passageways 14 extend upwardly behind the front walls of the ledges to the bottom of the recesses. At their lower ends all the vacuum passageways 11, 12, 13 and 14 are connected to a large chamber 17 defined in the base of the mold. The passageways and the chamber may be clearly seen in Fig. 3. The chamber 17 is itself further connected by a conduit 18 to a means for producing a vacuum, i. e. to a means for exhausting the air therefrom. No particular type of pumping apclosed herein but is to be accorded the full scope of the claims so as to embrace any and all equivalent devices.

Having described our invention, what we claim as new and desire to secure by Letters Patent is:

1. A mechanical action for artificial limb joints comprising a relatively stationary member and a ratchet segment rotatably mounted on the member, a lever rotatably mounted on the member with the rotational axis adjacent to the circumference of the ratchet segment, a locking bar on said lever having opposite curved faces positioned generally perpendicular to the radius from the rotational axis of the lever, said segment having a series of spaced generally radially extending bar receiving notches with faces complementary to the respective faces of the bar when in bar receiving position, said rotational axis of the lever being at a point adjacent a line tangent to an arc about the axis of said segment struck through the centers of the faces of said notch.

2. A mechanical action for artificial limb joints comprising a relatively stationary member and a ratchet segment rotatably mounted on the member on the axis of rotation of the joint, a lever rotatably mounted on the member with the rotational axis adjacent to and exterior of the circumference of the ratchet segment, a locking bar on said lever having opposite faces positioned generally perpendicular to the radius from the rotational axis of the lever and the faces, said segment being subject to a rotative load and having a series of spaced generally radially extending bar receiving notches with faces complementary to the respective faces of the bar when in bar receiving position, said rotational axis of the lever being within an angular distance of a line tangent to an arc about the axis of said segment struck through the centers of the faces of said notch such that the component of the force resulting from application of a rotative load tending to disengage the bar from the notch is less than the frictional force on the respective contacting faces.

3. A mechanical action for artificial limb joints comprising a relatively stationary member and a ratchet segment rotatably mounted on the member on the axis of rotation of the joint, a lever rotatably mounted on the member with the rotational axis adjacent to and exterior of the circumference of the ratchet segment, a locking bar on said lever having opposite arcuate faces positioned generally perpendicular to the radius from the rotational axis of the lever and the faces, said segment having a series of spaced generally radially extending bar receiving notches with arcuate faces complementary to the respective faces of the bar when at bar receiving position, said rotational axis of the lever being within an angular distance of five degrees inside of a line tangent to an arc about the axis of said segment struck through the centers of the faces of said notch.

4. A mechanical action for artificial limb joints comprising a relatively stationary member and a ratchet segment rotatably mounted on the member on the axis of rotation of the joint, a lever rotatably mounted on the member with the rotational axis adjacent to and exterior of the circumference of the ratchet segment, a locking bar on said lever having opposite arcuate faces of radius of curvature determined by the distance between the rotational axis of the lever and the respective face, said segment having a series of spaced generally radially extending bar receiving notches with arcuate faces complementary to the respective faces of the bar, said rotational axis of the lever being at a point within an angular distance of 15 degrees on either side of a line tangent to an arc centered at the axis of said segment and through the centers of the faces of a notch in bar engaging position, the faces of said notches having positions wherein said last faces are in engagement substantially throughout their areas with the respective faces of the bar when in bar engaging position.

5. A mechanical action for artificial limb joints comprising a pair of members wherein one member is adapted for attachment to a natural limb, parallel plates on one of the members, the other of said members comprising a tubular sleeve rotatably mounted on said plates providing thereby an articulating joint for said action, a ratchet segment fixed on said sleeve having a series of spaced generally radially extending notches, a lever pivotally mounted at a center of rotation on said one member, a locking bar fixed transversely on the lever, and an alternator connected between the lever and one of said members adapted to releasably hold said bar out of notch engagement position, said bar having opposite notch contacting faces curved in the same general direction and said notches having opposite curved bar engaging faces complementary to and adapted to engage the respective faces of the bar when in bar engaging position.

6. A mechanical action for artificial limb joints comprising a relatively stationary member adapted for attachment to a natural limb, parallel plates on said member and a tubular sleeve rotatably mounted on said plates providing thereby an articulating joint for said action, a ratchet segment fixed on said sleeve having a series of spaced generally radially extending notches, a lever pivotally mounted at a center of rotation on said member, a locking bar fixed transversely on the lever, a spring on said member normally urging said bar toward a notch engagement position, and an alternator connected between said member and the lever adapted to releasably hold said bar out of notch engagement position, said bar having opposite notch contacting faces of arcuate form and of radius determined by the distance between the respective face and said center of rotation of the lever, said notches having opposite bar engaging faces of arcuate form complementary to and adapted to engage the respective faces of the bar when in bar engaging position.

7. A ratchet resistant mechanical action for artificial limb joints comprising a base, a ratchet segment rotatably mounted on the base and a locking bar having a pivotal mounting on said base, said locking bar having opposite segment-engaging faces curved in the same general direction about the axis of said pivotal mounting, said segment having a series of peripheral bar receiving notches with opposite faces respectively complementary to the faces on said bar.

References Cited in the file of this patent

UNITED STATES PATENTS 2,637,042 Threewit _____ May 5, 1953

FOREIGN PATENTS 303,664 Germany _____ Feb. 11, 1918 mold surfaces 8 and 9. This initial position of the sheet 39 is shown by the uppermost dotted lines in Fig. 3. Next the sheet 39 is attached to clamping means positioned outwardly of the surface 9. Any suitable means may be used to accomplish this clamping, the hingedly connected clamping rings 40 and 41 shown in Fig. 3 being but one manner of securing the desired result. Whatever clamping means are used however, they are attached to the sheet in substantially the same position as the upper dotted line position of the clamps 40 and 41.

The clamping means should be such that once the clamping is completed a substantially airtight seal is provided between the edge of the sheet 39 and the clamping means themselves. For example if the clamping rings 40 and 41 are used, the plastic sheet is first placed so that its lower surface rests on the lower ring 41. Then the upper clamping ring 40 is swung downwardly on hinges, such as the hinge 42, so that it rests on the upper surface of the sheet 39. The sheet 39 is thereby effectively clamped between and sealed to the rings 40 and 41. In order that the clamping rings 40 and 41 may be moved to and held in the proper position to accomplish this clamping, i. e. to their dotted line position, the lower ring 41 is mounted by means of a plurality of movable actuating rods. For example, in the illustrated embodiment the ring 41 is mounted at the ends of longitudinally movable actuating rods 43. Since the upper ring 40 rests on and is hingedly attached to the lower ring 41, the rods 43 are, of course, effective to move it along with the ring 41. The rods 43 may be actuated by any suitable means as for example the hydraulic cylinders 44.

After the sheet of plastic material is clamped, it is next heated by means of the heating element 33 positioned above the mold. Once the sheet is sufficiently heated that it is rendered truly plastic or pliable, the clamping means are moved downwardly by means of the hydraulically actuated rods 43 until the lower ring 41 rests on the outer surface 10 of the mold. This movement of the clamping rings stretches the sheet 39 to the intermediate dotted line position designated 39a in Fig. 3. With the sheet and clamping rings in this position the space between the sheet and the mold is completely sealed off from the surrounding atmosphere by contact of the sheet with the outer edge 45 of the level 9 of the mold. Due to this contact there is thus no gap whereby air can flow into the space between the sheet and the mold. Further, even if there were some gap between the sheet 39 and the edge 45, when the sheet is stretched to its position 39a, the ring 41 and the mold surface 10 provide an additional seal. The contact between the ring 41 and the surface 10 forms a second seal outward of the edge 45 to further isolate the space between the mold and the sheet from the surrounding atmosphere. With reference to the means used to move the clamping means to their final solid line sealing position, it should be understood that other means than the hydraulic means shown could be used, for example the clamping means could be manually moved or could be driven by an electric motor through gears. Moreover, the clamping rings could be held stationary and the mold moved upwardly to complete the seal.

Figure 4:
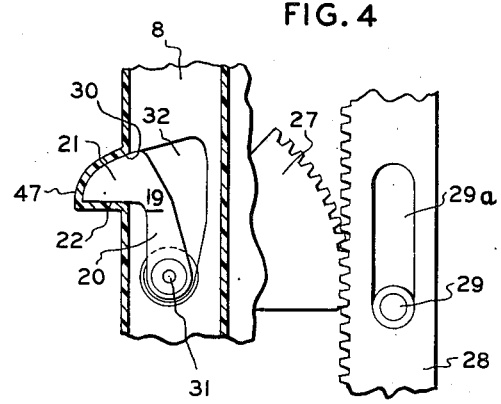
Fig. 4 is a fragmentary sectional view taken on the line 4—4 of Fig. 3.

During the heating of the sheet the elements 19 are rotated to their extended position shown in Fig. 4. This is of course accomplished by the gear means 27 and 28 and the shafts 23. Then, as the seal is being formed between the sheet 39 and the edge 45, vacuum is applied to the chamber 17 through the conduit 18, the vacuum pumping means being set in operation by switch or other suitable actuating means. This action in turn extending through the passageways 11, 12, 13 and 14 causes a vacuum to be applied in the space between the sheet 39 and the mold. In other words it exhausts the air from the space between the sheet 39 and the mold. As a result the higher atmospheric pressure on the top of the plastic sheet forces it downwardly until it assumes the contours of the mold. The atmospheric pressure on the top of the sheet being higher than the pressure beneath the sheet pushes it downwardly against the mold cavities and surfaces until it assumes the form of a refrigerator liner 46.

Simultaneously with the forming of the main contours of the liner 46 a vacuum is also drawn through the passageways 31. This vacuum in the passageways 31 pulls around the peripheries of the elements 19 where they extend through the apertures 30 and thereby the sheet is drawn tightly around the elements. More exactly, as a result of a portion of the air beneath the sheet being exhausted around the peripheries of the elements 19 by means of the apertures 30 and the passageways 31 the atmospheric pressure on the top of the sheet forces the sheet tightly around the elements on all sides thereof. In this manner sharply defined protuberances 47 are formed on the finished liner 46 closely corresponding in shape to the heads 21 of the elements 19. These protuberances, as shown, are formed on the sides of the large central recess of the finished liner. To aid in the forming of sharply defined protuberances the edges wherein the various surfaces of the forming heads 21 meet are preferably rounded off, whereby the plastic sheet may slip easily across the edges during the forming process.

As the plastic article or liner 46 including its protuberances or bosses 47 is formed, cooling liquid is passed through the passageways 35, 36, 37, and 38 of the mold to cool the liner and maintain the mold at a uniform temperature. This cooling action sets the liner in its finished position shown by the solid lines in Fig. 3 and aids in forming uniform pieces operation after operation. Once the liner has set, it may then be removed from the mold and will thereafter retain its molded contours.

However, because the elements 19 in their extended position would prevent the liner from being removed from the mold, the elements are first withdrawn to their retracted position within the mold walls. When in this retracted position, they no longer offer any obstruction to the movement of the liner and it may thereby be withdrawn from the mold without hindrance. Thus, once the liner has cooled and the elements 19 been retracted, the clamps are raised and the liner withdrawn from the mold. The liner is then removed from the clamps whereupon the only step remaining to produce the finished liner is to remove the flange or skirt which is necessarily formed outward of the surface 9 during the drawing process. Any suitable trimming operation may be employed to cut this undesired skirt from the edge of the finished liner.

Thus, it may be seen that by my invention I have provided a vacuum molding apparatus which is effective to form a recessed plastic article including sharply defined protuberances or bosses on the sides of the recesses. Through the provision of the movably mounted forming elements the protuberances may be shaped without interfering with the withdrawal of the finished article from the mold. Also, because of the peculiar shape of the forming elements, protuberances of maximum height for a given size of the mold wall may be produced. Moreover, due to my method of drawing a vacuum around the edges or peripheries of the protuberance forming elements themselves during the shaping of the plastic article, the resultant protuberances are very sharply formed and correspond closely in shape to the forming elements themselves.

While in accordance with the patent statutes I have described what is at present considered to be the preferred embodiment of my invention, it will be obvious to those skilled in the art that various changes and modifications may be made therein without departing from my invention, and I, therefore, aim by the appended claims